United States Patent [19]

Brown

[11] 4,390,824
[45] Jun. 28, 1983

[54] FULL WAVE MOTOR CONTROL CIRCUIT

[75] Inventor: Jack Brown, Union, N.J.

[73] Assignee: The Singer Company, Stamford, Conn.

[21] Appl. No.: 273,173

[22] Filed: Jun. 12, 1981

[51] Int. Cl.³ .............................................. H02P 5/16
[52] U.S. Cl. ................................. 318/331; 318/345 C
[58] Field of Search ............................... 318/309–312, 318/315, 317, 331, 345 C, 345 CA, 345 R

[56] References Cited

U.S. PATENT DOCUMENTS

| | | | |
|---|---|---|---|
| 3,177,418 | 4/1965 | Meng | 318/331 |
| 3,191,112 | 6/1965 | Cain | 318/246 |
| 3,195,029 | 7/1965 | Gilbreath | 318/246 |
| 3,237,073 | 2/1966 | Bartley et al. | 318/246 |
| 3,316,472 | 4/1967 | Taylor | 318/331 |
| 3,466,522 | 9/1969 | Cushing, Jr. | 318/331 |
| 3,601,673 | 8/1971 | Mason | 318/308 |
| 3,697,844 | 10/1972 | Dinger | 318/331 |
| 4,170,749 | 10/1979 | Soeda | 318/331 |
| 4,199,712 | 4/1980 | Odermann et al. | 318/345 C X |
| 4,246,521 | 1/1981 | Soeda et al. | 318/331 |
| 4,274,037 | 6/1981 | Soeda | 318/331 |

*Primary Examiner*—J. V. Truhe
*Assistant Examiner*—W. E. Duncanson, Jr.
*Attorney, Agent, or Firm*—David L. Davis; Robert E. Smith; Edward L. Bell

[57] ABSTRACT

A full wave motor control circuit is provided which utilizes a phase fired SCR to control the flow of current through the motor windings. Just before the end of each cycle, the charging capacitor which is connected across the gate and cathode of the SCR is discharged and the effective holding current level of the SCR is raised to insure SCR turn off.

2 Claims, 2 Drawing Figures

FULL WAVE MOTOR CONTROL CIRCUIT

DESCRIPTION

BACKGROUND OF THE INVENTION

This invention relates to motor control systems and, more particularly, to a full wave motor control system for operating a DC motor.

Motor control systems are well known in the prior art for operating a DC motor from an AC supply at preselected speeds. Typically, such systems utilize phase control circuits connected between the DC motor and the cyclically varying AC power supply. A firing circuit is provided which responds to speed selection, typically via a potentiometer, for firing the phase control circuit at the appropriate phase angle of the power supply so as to control the motor speed. In particular, the phase control circuit typically includes a silicon controlled rectifier (SCR) serially connected between the power supply and the motor and the firing circuit includes a charging capacitor connected to the gate electrode of the SCR so as to trigger the SCR upon reaching a predetermined voltage. Speed control is then attained by controlling the charging rate of the capacitor. Such systems typically further include some feedback from the motor for purposes of regulating the speed so that the selected speed is maintained irrespective of variations in line voltage and/or motor load.

The aforedescribed arrangement provides half wave operation of the motor. Disadvantageously, such operation is noisy, especially at low motor speeds. It is therefore an object of the present invention to provide a full wave motor control system which results in smoother and quieter motor operation.

It would be desireable to be able to utilize the basic half wave circuitry in a full wave system because such circuitry has proven to be extremely reliable and cost effective. With standard half wave operation, the charging capacitor has sufficient time to be discharged and the SCR is turned off during the non-operative half cycle of the AC supply. However, with full wave operation there is no such non-operative time. It is therefore a further object of this invention to provide a full wave motor control system which utilizes a conventional half wave phase control circuit and insures that the charging capacitor is fully discharged and the SCR is turned off at the start of each half cycle of the AC supply.

SUMMARY OF THE INVENTION

The foregoing and additional objects are attained in accordance with the principles of this invention by providing a system for operating a motor from an alternating current power source comprising a full wave rectifier having an input connected to the source and having positive and negative output terminals, a silicon controlled rectifier connected in series with the motor between the output terminals of a polarity to allow current to flow through the silicon controlled rectifier and the motor when the silicon controlled rectifier is turned on, a charging capacitor connected across the gate and cathode of the silicon controlled rectifier, current control means connected in circuit with the charging capacitor for controlling the current supplied to the charging capacitor, the rate at which current is supplied to the charging capacitor controlling the motor speed by determining the point in each cycle of the rectifier output when the silicon controlled rectifier is turned on, and discharge means effective during every cycle of the rectifier output and responsive to the level of the rectifier output being below a predetermined threshold for providing a discharge path for the charging capacitor and for raising the effective holding current level for the silicon controlled rectifier.

In accordance with an aspect of this invention, the discharge means includes a first transistor having its collector-emitter path connected across the charging capacitor, a diode having its anode connected to the full wave rectifier positive output terminal, a second capacitor having a first side connected to the cathode of the diode and a second side connected to the full wave rectifier negative output terminal, means for coupling the base of the first transistor to the first side of the second capacitor, a second transistor having its collector-emitter path connected across the base-emitter path of the first transistor, and means for coupling the base of the second transistor to the full wave rectifier positive output terminal.

BRIEF DESCRIPTION OF THE DRAWINGS

The foregoing will be more readily apparent upon reading the following description in conjunction with the drawings in which like reference numerals in different figures thereof denote like elements and wherein.

DETAILED DESCRIPTION

Figure 1:
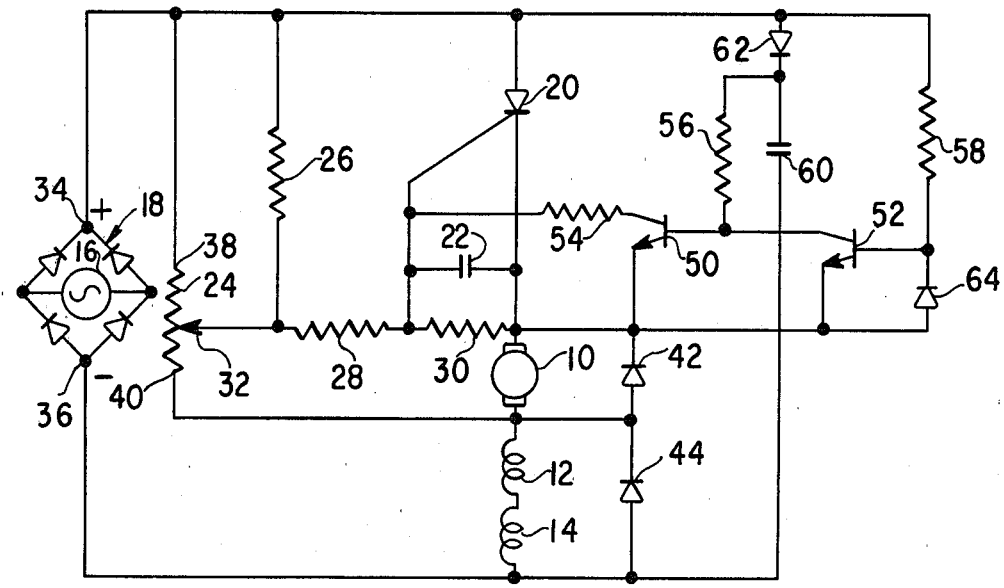
FIG. 1 is a schematic circuit diagram of an illustrative embodiment of a full wave motor control circuit for a universal motor.

Referring now to FIG. 1, shown therein is a circuit for controlling the speed of a motor having an armature winding 10 and field windings 12 and 14. The motor windings are serially connected to a cyclically varying power supply 16 through a full wave rectifier diode bridge 18. The power supply 16 may be commercially available 115 volt 60 hertz power.

Serially interposed between the rectifier 18 and the motor windings 10, 12 and 14, is a silicon controlled rectifier (SCR) 20. When triggered into conduction, the SCR 20 allows current to flow through the motor windings 10, 12 and 14.

To trigger the SCR 20 into conduction, there is provided a firing circuit which includes a charging capacitor 22 and a current control circuit comprising the resistors 24, 26, 28 and 30. The charging capacitor 22 is connected across the gate and cathode of the SCR 20 and, as is well known in the art, when the voltage across the charging capacitor 22 reaches a predetermined threshold level, the SCR 20 is triggered into conduction. Within each rectified cycle at the output of the rectifier 18, the sooner the voltage across the charging capacitor 22 reaches that predetermined threshold value, the sooner the SCR 20 is triggered into conduction and the more current flows through the motor windings 10, 12 and 14. Therefore, to increase the motor speed, the charging capacitor 22 is charged more quickly so that the SCR 20 is triggered earlier in the cycle and to drive the motor slower, the capacitor 22 is charged at a slower rate so as to trigger the SCR 20 at a later point in the cycle.

The rate at which the capacitor 22 is charged is determined by the setting of the tap 32 of the potentiometer 24. The charging path for the capacitor 22 is from the positive output 34 of the rectifier 18, through the parallel combination of the resistor 26 and the tapped potentiometer 24, through the resistor 28, through the capacitor 22, through the armature winding 10, through the field winding 12, through the field winding 14, and to the negative output terminal 36 of the rectifier 18. Therefore, the closer that the tap 32 is to the end 38 of the potentiometer 24 the faster the charging rate of the capacitor 22 and the faster that the motor will run. Conversely, the closer that the tap 32 is to the end 40 of the potentiometer 24 the slower the charging rate of the capacitor 22 and the slower that the motor will run. The resistor 26 provides a rapid voltage change at low settings of the potentiometer 24.

The aforedescribed circuit is self-regulating in that prior to the firing of the SCR 20, as the armature winding 10 rotates through the residual field set up by the field windings 12 and 14, a back EMF is generated in opposition to the capacitor charging path which is directly proportional to the speed of rotation of the armature winding 10. This voltage of the armature winding 10 prior to firing the SCR 20 bucks the flow of current to the capacitor 22 and causes a longer time to elapse before the voltage across the capacitor 22 reaches the firing voltage of the SCR 20. This automatically retards the firing angle, allowing the motor to reach a stable equilibrium speed. If a load is now applied to the motor, its speed tends to decrease, reducing the residual induced voltage in the armature winding 10 and automatically advancing the firing angle. This increases motor torque to handle the increased load and maintains motor speed essentially constant. Diode 42, across the armature winding 10, and diode 44, across the field windings 12 and 14, allow circulation of motor current when the SCR 20 shuts off. The circulating field current also provides an enhanced magnetic field during the non-conducting period, resulting in a greater feedback voltage generated by the armature winding 10.

The aforedescribed circuitry is conventional for half wave operation. With such half wave operation, the capacitor 22 is discharged during the non-operation half cycle of the AC supply and the SCR 20 is turned off when the current from its anode to its cathode drops below a minimum holding level, which is determined by the gate to cathode resistance. In accordance with the principles of this invention, the conventional half wave arrangement is converted to operate under full wave conditions by the addition of low cost, low voltage, circuitry which insures that the capacitor 22 is fully discharged and the SCR 20 turned off before the beginning of each rectified cycle. This additional discharge circuitry includes a first transistor 50, a second transistor 52, resistors 54, 56, and 58, capacitor 60, and diodes 62 and 64. In operation, the capacitor 60 charges through the diode 62 to nearly the peak voltage between the anode and cathode of the SCR 20. When the voltage between the anode and cathode of the SCR 20 is low, near the beginning and end of each rectified cycle, very little current can flow through the resistor 58 to the base-emitter junction of the transistor 52, and thus very little current can flow from the collector to emitter of the transistor 52. However, the capacitor 60 provides a current that can flow through the resistor 56 to the base-emitter junction of the transistor 50 and therefore current can flow through the resistor 54 and through the collector-emitter of the transistor 50, discharging the capacitor 22. At the same time as the capacitor 22 is discharged, this provides a low resistance across the gate-cathode of the SCR 20. A characteristic of the SCR 20 is that the lower the gate to cathode resistance thereof, the higher the minimum holding current. Accordingly, the SCR 20 is reliably turned off and the capacitor 22 discharged before the end of each rectified cycle. Since the capacitor 22 is discharged before the SCR 20 turns off, the SCR 20 will not become conductive again until some time during the next rectified cycle. On the other hand, when the voltage between the anode and cathode of the SCR 20 is high enough, current can flow through the resistor 58 and the base-emitter junction of the transistor 52, which causes conduction between the collector-emitter of the transistor 52 to shunt away the current that would otherwise flow into the base-emitter junction of the transistor 50, causing it to be non-conductive. This permits normal charging of the capacitor 22.

Figure 2:
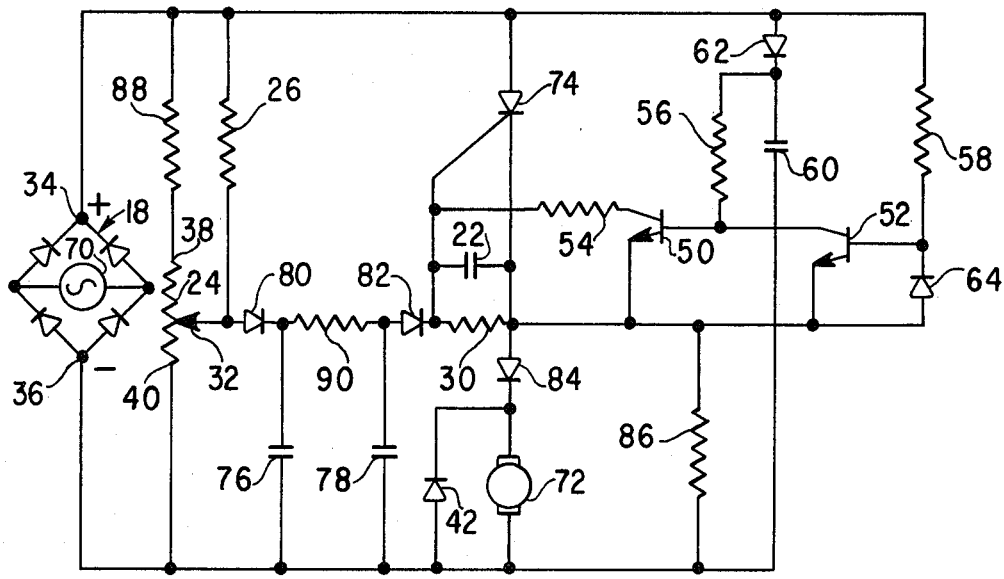
FIG. 2 is a schematic circuit diagram of an illustrative embodiment of a full wave motor control circuit for a permanent magnet motor.

FIG. 2 shows a schematic circuit diagram for full wave control of a permanent magnet motor operated from a source 70 of commercially available 220 volt 60 hertz power. The circuit of FIG. 2 is very similar to the circuit of FIG. 1 and operates in essentially the same manner. As shown in FIG. 2, the armature 72 of the motor is connected in series with the SCR 74. The capacitors 76 and 78 provide additional delay in the phase of voltage supplied to the gate of the SCR 74 since a permanent magnet motor may need a small conduction angle to achieve very low speed under light loading conditions. The diode 80 isolates the anode of the SCR 74 from the DC component of voltage across the capacitor 76 which might otherwise prevent the SCR 74 from turning off. The diode 82 prevents the capacitor 78 from charging up to the peak voltage across the motor, particularly at low speed operation. The diode 84 and the resistor 86 reduce the effect of the feedback voltage generated by the motor at higher speed operation.

The following table of components gives component types and values for illustrative embodiments of the circuitry shown in FIGS. 1 and 2.

| TABLE OF COMPONENTS | |
|---|---|
| All diodes for 115 volt power | 1N4003 |
| All diodes for 220 volt power | 1N4004 |
| SCR 20 | C106B1 |
| SCR 74 | C106D1 |
| Potentiometer 24 | 1 Megohm |
| Resistor 26 | 220 Kilohms |
| Resistor 28 | 47 Kilohms |
| Resistor 30 | 10 Kilohms |
| Resistor 54 | 3.3 Ohms |
| Resistor 56 | 180 Kilohms |
| Resistor 58 | 3.3 Megohms |
| Resistor 86 | 56 Kilohms |
| Resistor 88 | 1 Megohm |
| Resistor 90 | 100 Kilohms |
| Capacitor 22 | 3.3 Microfarads |
| Capacitor 60 | 0.1 Microfarads |
| Capacitor 76 | 0.05 Microfarads |
| Capacitor 78 | 0.01 Microfarads |

Accordingly, there have been disclosed full wave motor control circuits for operating a universal motor and a permanent magnet motor. The disclosed circuits provide reliable full wave operation of the motors with no skip pulsing. They provide low cost additions to conventional half wave operating circuits. It is understood that the above-described embodiments are merely illustrative of the application of the principles of this invention. Numerous other embodiments may be devised by those skilled in the art without departing from the spirit and scope of this invention, as defined by the appended claims.

I claim:

1. A system for operating a motor from an alternating current power source comprising:
    a full wave rectifier having an input connected to said source and having positive and negative output terminals;
    a silicon controlled rectifier connected in series with said motor between said output terminals of a polarity to allow current to flow through said silicon controlled rectifier and said motor when said silicon controlled rectifier is turned on;
    a charging capacitor connected across the gate and cathode of said silicon controlled rectifier;
    current control means connected in circuit with said charging capacitor for controlling the current supplied to said charging capacitor, the rate at which current is supplied to said charging capacitor controlling the motor speed by determining the point in each cycle of the power source when said silicon controlled rectifier is turned on; and
    discharge means effective during every cycle of the full wave rectifier output and responsive to the level of the full wave rectifier output being below a predetermined threshold for providing a discharge path for said charging capacitor and for raising the effective holding current level for said silicon controlled rectifier.

2. The system according to claim 1 wherein said discharge means includes:
    a first transistor having its collector-emitter path connected across said charging capacitor;
    a diode having its anode connected to the full wave rectifier positive output terminal;
    a second capacitor having a first side connected to the cathode of said diode and a second side connected to the full wave rectifier negative output terminal;
    means for coupling the base of said first transistor to the first side of said second capacitor;
    a second transistor having its collector-emitter path connected across the base-emitter path of said first transistor; and
    means for coupling the base of said second transistor to the full wave rectifier positive output terminal.

* * * * *